United States Patent
Shah

(10) Patent No.: US 7,036,743 B2
(45) Date of Patent: May 2, 2006

(54) CONTINUOUS FAN CONTROL IN A MULTI-ZONE HVAC SYSTEM

(75) Inventor: Rajendra K. Shah, Indianapolis, IN (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 10/968,497

(22) Filed: Oct. 19, 2004

(65) Prior Publication Data

US 2005/0156054 A1    Jul. 21, 2005

Related U.S. Application Data

(60) Provisional application No. 60/537,526, filed on Jan. 20, 2004.

(51) Int. Cl.
*F24F 7/00* (2006.01)
*F25D 17/04* (2006.01)

(52) U.S. Cl. .................... 236/49.3; 62/186
(58) Field of Classification Search ............ 62/129, 62/186; 236/49.3; 165/205, 208, 212
See application file for complete search history.

(56) References Cited

U.S. PATENT DOCUMENTS 4,549,601 A * 10/1985 Wellman et al. ............ 165/205

* cited by examiner

*Primary Examiner*—Chen Wen Jiang
(74) *Attorney, Agent, or Firm*—Carlson, Gaskey & Olds

(57) ABSTRACT

A multi-zoned HVAC system includes a control for independently determining the amount of airflow delivered to each zone within the HVAC system. The control determines nominal zone airflow and continuous fan airflow levels for each zone based upon a user selected fan airflow level and the relative size of each zone in the HVAC system. The control determines the desired system airflow for the entire system once the continuous fan airflow levels for each zone are determined. The HVAC system provides a continuous fan airflow to each zone independently of the continuous fan airflow delivered to any other zone and irrespective of the relative size difference of the zones.

26 Claims, 4 Drawing Sheets

CONTINUOUS FAN CONTROL IN A MULTI-ZONE HVAC SYSTEM

This application claims priority to U.S. Provisional Patent Application Ser. No. 60/537,526, filed Jan. 20, 2004, and entitled "Continuous Fan Control in a Multi-Zone HVAC System."

BACKGROUND OF THE INVENTION

The present invention relates to a method and control for the continuous fan airflow delivered to each of several zones in a multi-zone HVAC system, and more particularly to a control that allows a specified continuous fan airflow to be delivered simultaneously to all zones of the system.

Conventional multi-zone HVAC systems include temperature changing components for changing the temperature and condition of air. Indoor air handlers drive air from the temperature changing component through supply ducts to several zones within a building. Each supply duct typically includes dampers that selectively restrict airflow into each zone to achieve a desired temperature.

Conventional systems have traditionally offered a continuous fan function that provides selection between fan "on" or fan "auto" operation. Operating the fan continuously is beneficial because air circulation equalizes temperatures and improves air quality by allowing system filters and other air quality devices to continuously clean the air. However, due to energy and noise concerns, some users may be reluctant to operate the system continuously by maintaining the system at fan "on".

A multi-zoned HVAC system provides additional challenges regarding continuous fan operation. For air circulation, energy, noise, and size reasons, each zone may require different continuous fan speeds. Some zoned HVAC systems recognize the fan "on" setting at the thermostat for each zone and open the dampers to those zones while running the system fan at a fixed speed. Disadvantageously the fan airflow delivered to each zone is not adjustable, and the airflow delivered to each zone is dependant on that delivered to other zones. For example, in a system with two zones, with duct segments for both zones being identical and with both zones having set fan "on", each zone will receive half of the system airflow. However, if only zone 1 has fan "on", then the damper for zone 2 will close. Zone 1 will then receive the full system airflow, which would result in twice the amount of airflow as before. With multiple zones having varying duct sizes, the variations in continuous fan airflow delivered to any zone may be quite large which may result in unbalanced temperature changes.

Accordingly, it is desirable to provide a multi-zone HVAC system which delivers a continuous fan airflow to each zone independently of the continuous fan airflow delivered to any other zone and irrespective of the relative size difference of the zones.

SUMMARY OF THE INVENTION

The HVAC system of the present invention provides a control which determines the amount of airflow delivered to each zone independently of the amount of airflow delivered to the other zones within the HVAC system.

The control determines a nominal system airflow and a relative zone size for each zone in the HVAC system. The control determines a nominal zone airflow delivered to each zone based upon the nominal system airflow and a relative size for each zone in the HVAC system. The desired continuous fan airflow delivered to each zone is based upon a proportionality constant assigned to a user selected fan airflow level for each specific zone. Once the desired continuous fan airflow for each zone is determined, the desired system airflow is determined by the summation of every zone's desired continuous fan airflow. The control opens the damper associated with each zone to a position corresponding to the proportionality constant assigned by the user selected fan airflow level, and the desired system airflow is then delivered to the zones within the HVAC system.

A multi-zone HVAC system according to the present invention provides continuous fan airflow to each zone independently of the continuous fan airflow delivered to any other zone and irrespective of the relative size difference of the zones.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
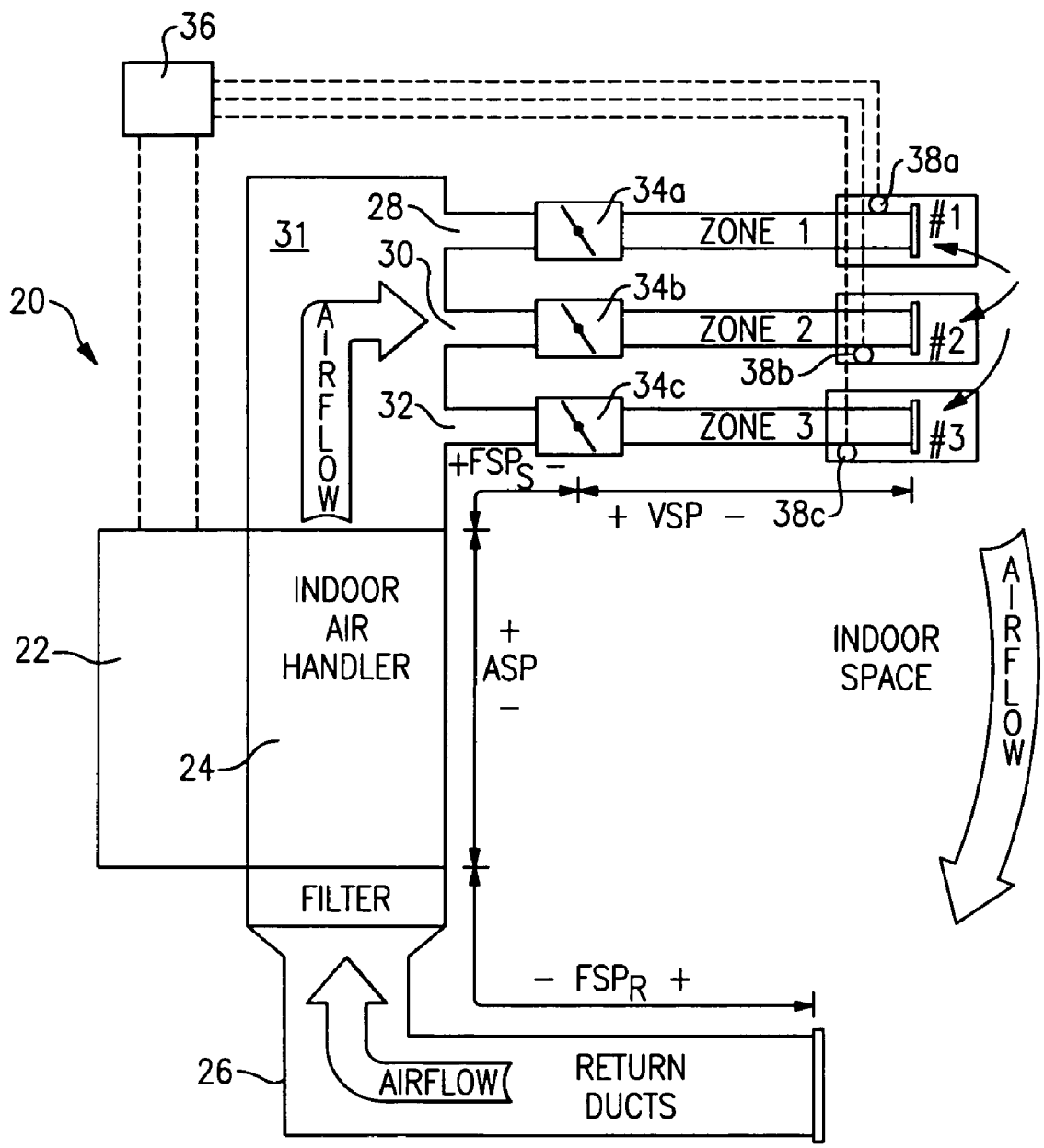
FIG. 1 is a schematic view of a building HVAC system.

Referring to FIG. 1, a multi-zone HVAC system 20 is schematically illustrated. A temperature changing component 22 communicates with an indoor air handler 24. The temperature changing component 22 changes the condition of air and typically includes an indoor unit such as a furnace or heater coil, and/or an outdoor unit such as a condensing unit or a heat pump.

Associated with the indoor air handler 24 is a plenum 31. Supply ducts 28, 30, and 32 extend between the plenum 31 and distinct zones 1, 2, and 3. A damper 34a, 34b, and 34c is located within each supply duct 28, 30 and 32 respectively. A zone control 38a, 38b, and 38c (one shown in FIG. 2) is associated with distinct zones 1, 2, and 3 respectively.

A system control 36 communicates with each of the zone controls 38a, 38b, and 38c. The system control 36 is preferably a microprocessor or the like.

The zone controls 38a, 38b, and 38c allow a user to set desired temperatures, airflows etc. for each of the distinct zones 1, 2, and 3 respectively. The zone controls 38a, 38b, and 38c preferably include a temperature sensor for providing an actual temperature back to the system control 36. The system control 36 operates the dampers 34, the temperature changing component 22, the indoor air handler 24 and also communicates with zone controls 38a, 38b, and 38c located within each of the distinct zones 1, 2, and 3.

As a user inputs desired temperatures and airflows etc. at zone controls 38a, 38b, and 38c, the data is communicated to the system control 36 which recognizes the user selected criterion and communicates with the temperature changing component 22 to change the condition of the air provided by the indoor air handler 24 accordingly. It should be understood that a user may enter fan airflow levels for any zone in the HVAC system from a single zone control 38a, 38b or 38c. The indoor air handler 24 communicates the air from return ducts 26a, 26b, and 26c, conditions the air, and drives the conditioned air into the plenum 31. From the plenum 31, the air enters the supply ducts 28, 30, and 32 associated with the distinct zones 1, 2, and 3.

The flow of conditioned air communicated to each of the zones 1, 2, and 3 is controlled by the position of the damper 34a, 34b, and 34c located within each of the supply ducts 28, 30, and 32. The dampers 34a, 34b, and 34c may be selectively opened or closed to restrict or allow additional airflow into the zones 1, 2, and 3. Preferably, the damper 34a, 34b, and 34c may be positioned at incremental positions between the full open and the full closed positions.

Once the air enters and circulates within the zones 1, 2, and 3 it enters the return ducts 26 where it is filtered and communicated again through the indoor air handler 24 as demanded by the system control 36.

Figure 3:
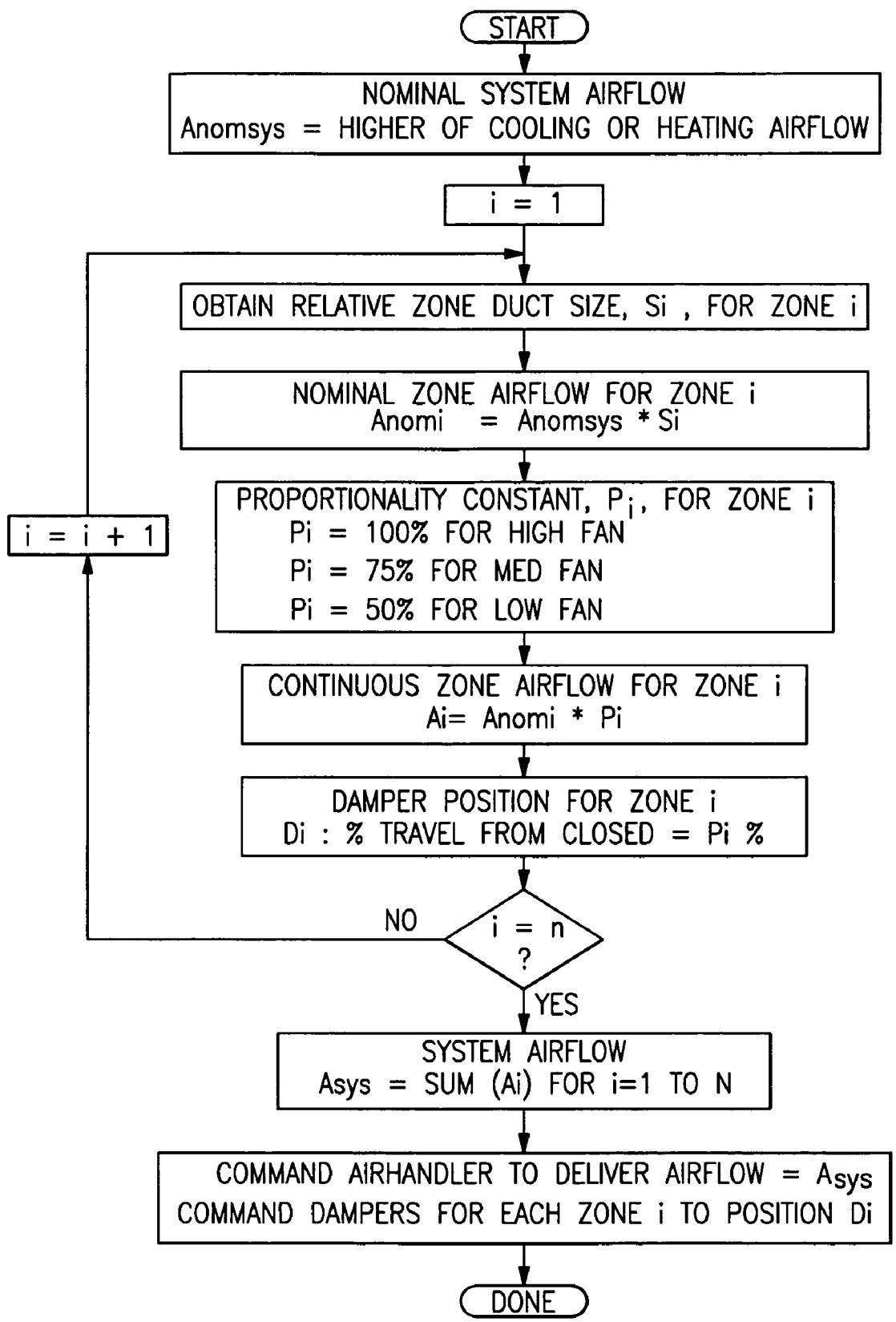
FIG. 3 is a flowchart of the inventive method.

Referring to FIG. 3, a computational process stored within the system control 36 to determine a desired quantity of continuous fan airflow in each zone of the HVAC system is illustrated in flowchart form. Initially, at step A, the nominal system airflow (Anomsys) is determined. Anomsys represents the total system airflow normally delivered by the indoor air handler 24 to each zone with all the zone dampers 34a, 34b, and 34c open in either the cooling or heating operating modes, whichever is higher.

The system determines the relative sizes of the duct segments associated with each zone in the system. This is shown at step B. For further understanding of the size determination of duct segments associated with a zone in an HVAC system, attention is directed to co-pending U.S. patent application Ser. No. 10/932,179, filed Sep. 1, 2004, and entitled "Method and System for Determining Relative Duct Sizes by Zone in an HVAC System," which is hereby incorporated by reference in its entirety. The algorithm disclosed therein relates to a determination of the sizes of the ducts 28, 30, and 32 associated with the distinct zones 1, 2, and 3 such that when any system airflow is delivered by the air handler 24 with the dampers 34a, 34b, and 34c full open, each zone 1, 2, and 3 receives an amount of the airflow in proportion to the zone's duct segment size relative to the combined size of all the zone duct segments.

At step C, the nominal system airflow (Anomsys) value and the relative duct size (Si) information are utilized to calculate nominal zone airflow (Anomi) values. The nominal zone airflow for zone i represents zone i's portion of the nominal system airflow (Anomsys), based upon the relative size of each zone i in relation to the combined size of the total number of zones (zones 1, 2 and 3). Anomi is computed by the following formula:

$$Anomi = Anomsys * Si \quad [1]$$

A proportionality constant (Pi) is selected for each of zones 1, 2, and 3 in response to a user selected fan airflow level at step D. In one embodiment, a user selects one of four levels of airflow for each zone: HIGH, MEDIUM, LOW, and OFF. Thus, the proportionality constant assigned to zone 1 by the system control 36 is as follows:

| Selected Level of Airflow | Pi |
| --- | --- |
| HIGH | 100% |
| MEDIUM | 75% |
| LOW | 50% |
| OFF | 0% |

It should be understood that other airflow levels and associated proportionality constant (Pi) percentages may also be utilized by the present invention.

At step E the desired continuous fan airflow (Ai) for each zone 1, 2, and 3 is individually calculated by utilizing the nominal zone airflow (Anomi) value and the user assigned proportionality constant (Pi). The desired continuous fan airflow (Ai) value represents the portion of the nominal system airflow actually delivered to each zone i based upon that zone's relative size in comparison to the combined size of all the zones and the user selected fan airflow level. For each of the zones 1, 2, and 3, the desired continuous fan airflow (Ai) is computed as:

$$Ai = Anomi * Pi. \quad [2]$$

The system then proceeds to step F in which the dampers 34a, 34b, and 34c for each of zone i are modulated to a position Di as commanded by the system control 36. The position Di, or the percent travel of the damper blade from the fully closed to the fully open position, is equal to the proportionality constant (Pi). In one preferred embodiment, the damper 34 characteristics are linear. It should be understood that other damper 34 characteristics may be utilized by the system control 36.

The system control 36 computes the desired system airflow (Asys) at step G. The desired continuous fan airflow (Ai) for each zone i is utilized in making this determination. The desired system airflow (Asys) represents the total amount of airflow delivered by the air handler 24 to be divided appropriately among the zones 1, 2 and 3 in relation to the relative size and the user selected fan airflow level for each zone. Thus, the desired system airflow (Asys) is computed as:

$$Asys = SUM(Ai) \text{ for } i=1 \text{ to } n. \quad [3]$$

At this point the computation of the continuous fan airflow for each zone in a multi-zone HVAC system is complete, and at step H the system control 36 commands the air handler 24 to deliver an airflow to the plenum 31 which is equal to the desired system airflow (Asys). Each of the distinct zones 1, 2, and 3 will then accept the amount of airflow corresponding to that airflow which the user required at controls 38a, 38b, and 38c and for which the dampers 34a, 34b and 34c have been positioned.

Figure 2:
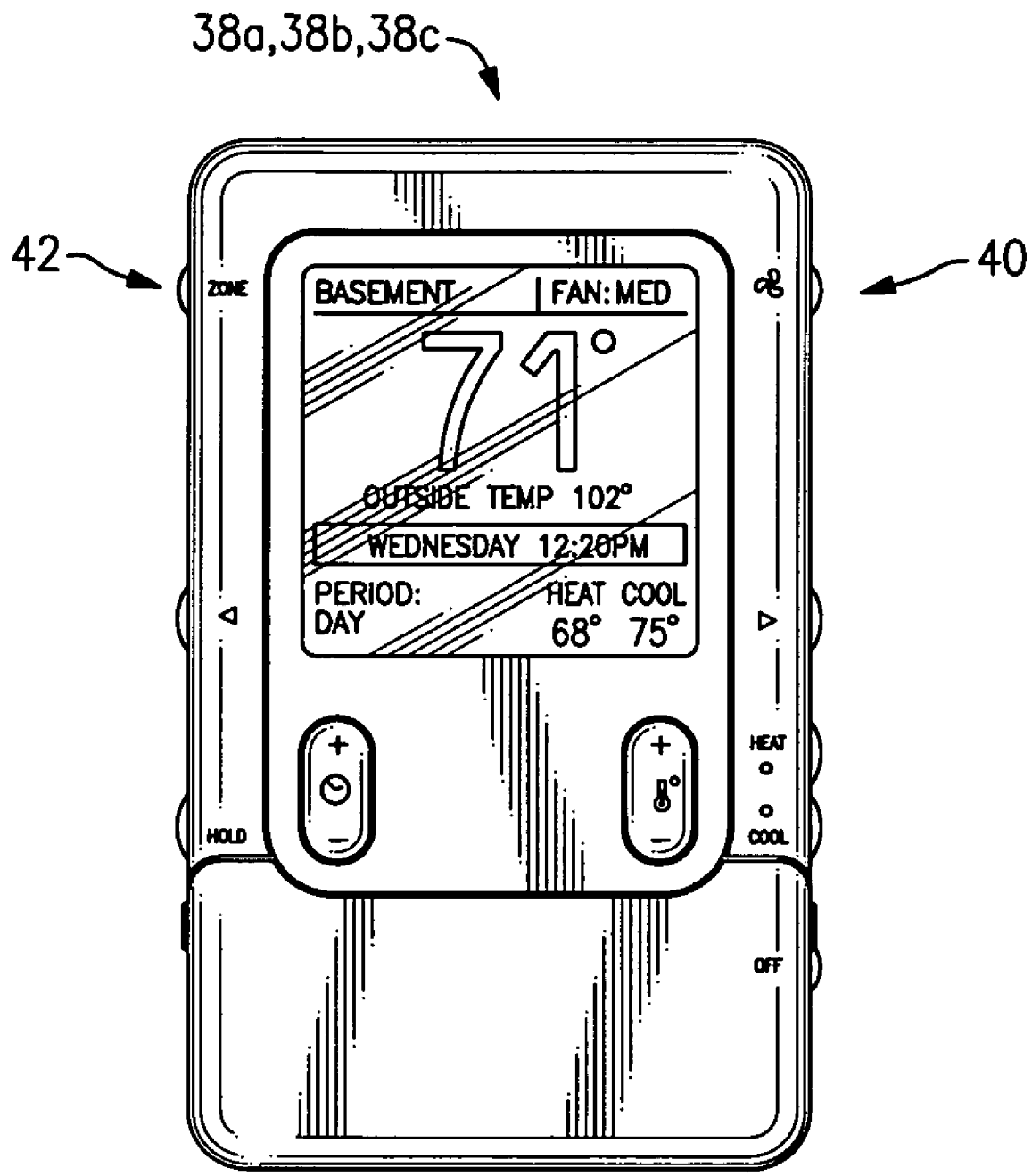
FIG. 2 shows exemplary displays at a user interface.

Referring to FIG. 2, the user selected level of airflow HIGH, MEDIUM, LOW, and OFF is provided as an option at each zone control 38a, 38b, and 38c by a fan key 40. It should be understood that other airflow levels and associated proportionality constant (Pi) percentages may also be utilized by the present invention. Further, the zone controls 38a, 38b, and 38c contain a zone key 42. The zone key 42 is utilized to select between the zones 1, 2, and 3 the level of fan airflow to be delivered by the indoor air handler 24. The zone controls 38a, 38b, and 38c also provide a user with the current temperature in each of the zones 1, 2, and 3.

Figure 4:
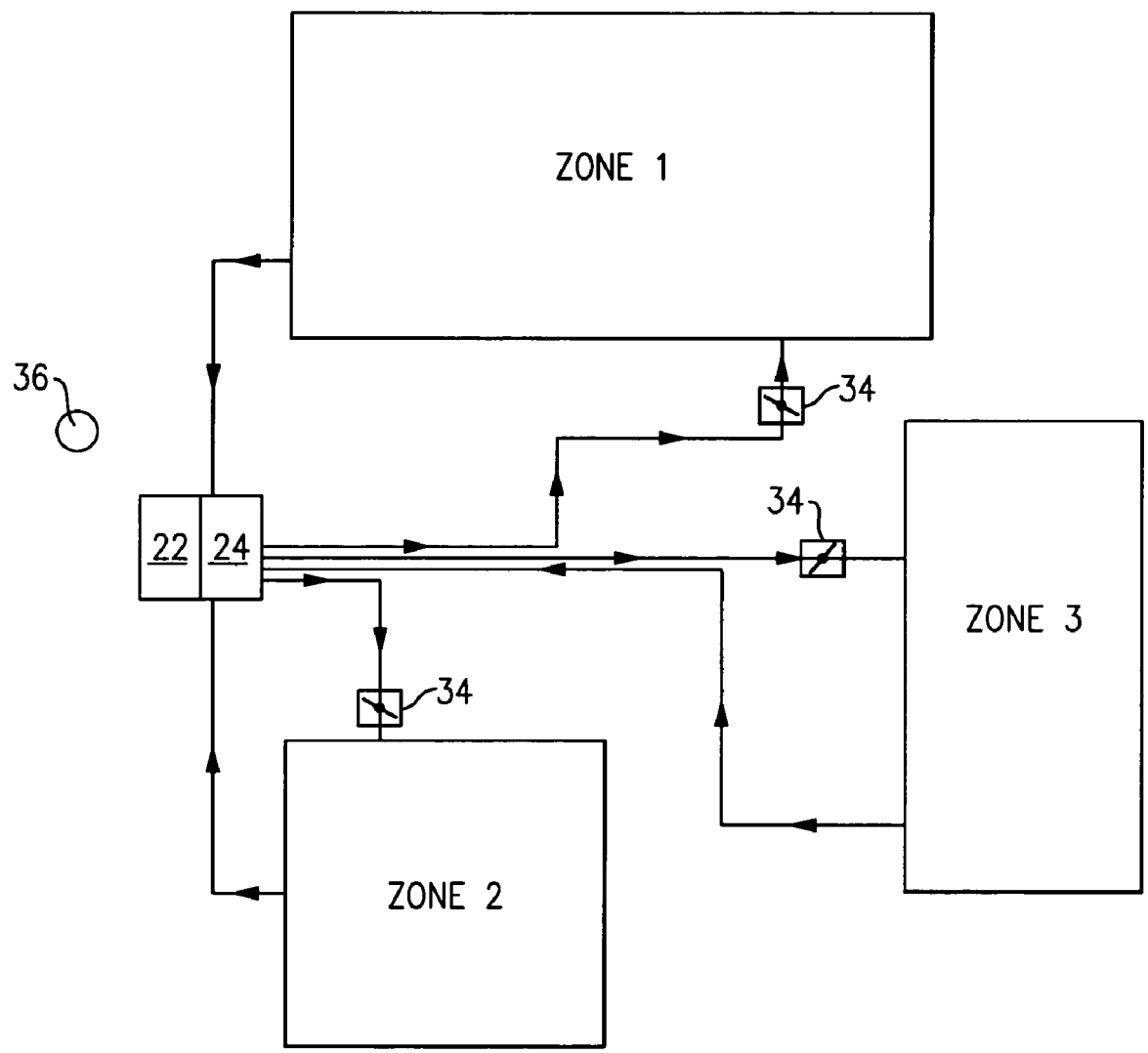
FIG. 4 is a schematic representation of the continuous fan control performed by the HVAC system of the present invention.

Referring to FIG. 4, a multiple of zones which includes the HVAC system 20 of the present invention is illustrated in schematic form. For example only, three zones are present with zone 1 being three times the size of zone 2, and zone 3 being twice the size of zone 2. The relative zone duct size Si for each zone is as follows: 50% for zone 1, 17% for zone 2, and 33% for zone 3. The user selected fan airflow level is set at high at zone controls 38a, 38b, and 38c for zone 1, zone 2, and zone 3 respectively. With a nominal system airflow, for example only, of 1050 cubic feet per minute, the control of the present invention calculates the required amount of continuous airflow to be delivered by indoor air handler 24 to zone 1, zone 2 and zone 3. Because each zone is set at high, all dampers 34a, 34b, and 34c are set at full open position. Therefore, based on the nominal system airflow, the relative size of each zone, and the user selected fan airflow levels, zone 1 receives 525 cubic feet per minute of airflow, zone 2 receives 175 cubic feet per minute of airflow, and zone 3 receives 350 cubic feet per minute of airflow. The full nominal system airflow of 1050 cubic feet per minute is delivered by indoor air handler 24 as commanded by the system control 36.

In another example, with the relative zone duct sizes Si for zone 1, zone 2 and zone 3 remaining at 50%, 17%, and 33% respectively, and with the nominal system airflow remaining at 1050 cubic feet per minute, a user adjusts the fan airflows to a high airflow in zone 1, a low airflow in zone 2, and the airflow in zone 3 is set at off at the zone controls 38a, 38b, and 38c respectively. In this situation, the damper 34a for zone 1 is at full open position and the damper 34b for zone 2 is at an intermediate position allowing 50% of the nominal zone 2 airflow. The damper 34c of zone 3 is closed. As a result, zone 1 requires 525 cubic feet per minute of airflow as the user selected fan airflow level for zone 1 has not changed. Zone 2 requires a lower amount of airflow due to the change in the user selected fan airflow level from high to low. At the low setting, zone 2 requires half the amount of airflow than that delivered at a high fan setting as the proportionality constant for a high fan setting is 100% while the proportionality constant for the low setting is 50%. Zone 2 requires 87.5 cubic feet per minute of airflow. Zone 3 requires zero airflow as the user selected fan airflow level for zone 3 was set at off. The system control 36 adjusts the amount of desired system airflow delivered by the indoor air handler 24 to reflect the change in desired user inputs resulting in a delivered system airflow equal to 612.5 cubic feet per minute.

In another example, with the relative zone duct sizes Si for zone 1, zone 2, and zone 3 remaining at 50%, 17%, and 33% respectively, and with the nominal system airflow remaining at 1050 cubic feet per minute, a user adjusts the fan airflows at zone controls 38a, 38b, or 38c to a high airflow in zone 1, a low airflow in zone 2, and a medium airflow in zone 3. In this situation, the damper 34a for zone 1 is at full open position, the damper 34b for zone 2 is at an intermediate position allowing 50% of the nominal zone 2 airflow, and the damper 34c for zone 3 is at an intermediate position allowing 75% of the nominal zone 3 airflow. As with the previous example, zone 1 requires 525 cubic feet per minute of airflow and zone 2 requires 87.5 cubic feet perm minute of airflow as the user selected fan airflow levels for these zones have not changed. Zone 3 requires a higher amount of airflow due to the change in the user selected fan airflow level from an off setting to a medium setting. Based on the relative size of zone 3 (33%) and the user selected fan airflow level of medium (75%), zone 3 requires 262.5 cubic feet per minute of airflow. The system control 36 adjusts the amount of desired system airflow delivered by indoor air handler 24 to reflect the change in desired user inputs resulting in a delivered system airflow equal to 875 cubic feet per minute.

Thus, based upon the foregoing examples, it is evident that the amount of airflow each zone receives is dependant upon the user selected fan airflow level and the relative size of the zones in the HVAC system yet is independent of the amount of airflow delivered to the other zones.

That the foregoing description shall be interpreted as illustrative and not in a limiting sense is thus made apparent. A worker of ordinary skill in the art would recognize that certain modifications would come within the scope of this invention. For that reason, the following claims should be studied to determine the true scope and content of this invention.

What is claimed is:

1. An HVAC system comprising:
   a temperature changing component;
   a first duct system which communicates airflow between said temperature changing component and a first zone, said first duct system defining a first volume;
   a second duct system which communicates airflow between said temperature changing component and a second zone, said second duct system defining a second volume; and
   a system control which independently controls a system airflow to deliver a first continuous zone airflow to said first zone and a second continuous zone airflow to said second zone in response to a relative volume difference between said first volume and said second volume.

2. The HVAC system as recited in claim 1, wherein said first duct system includes a first zone damper for restricting the amount of airflow communicated to said first zone and said second duct system includes a second zone damper for restricting the amount of airflow communicated to said second zone.

3. The HVAC system as recited in claim 1, wherein said first volume includes said first zone.

4. The HVAC system as recited in claim 1, wherein said second volume includes said second zone.

5. The HVAC system as recited in claim 1, wherein said system control commands said first zone damper and said second zone damper to move between a multitude of damper positions.

6. The HVAC system as recited in claim 5, wherein said multitude of damper positions of said first zone damper and said second zone damper include a full open position, a full closed position, and an intermediate position.

7. The HVAC system as recited in claim 5, wherein said third duct system includes a third zone damper for restricting the amount of airflow permitted to enter said third zone.

8. The HVAC system as recited in claim 1, further comprising a third duct system which communicates airflow between said temperature changing component and a third zone, said third duct system defining a third volume.

9. The HVAC system as recited in claim 8, wherein said third volume includes said third zone.

10. The HVAC system as recited in claim 1, wherein said system control independently controls a system airflow to deliver said first continuous zone airflow to said first zone, said second continuous zone airflow to said second zone, and a third continuous zone airflow to said third zone in response to a relative volume difference between said first volume, said second volume, and said third volume.

11. A method of determining a continuous zone airflow to a multiple of zones comprising the steps of:
   (1) determining a system airflow; and
   (2) determining a first zone airflow to a first zone and a second zone airflow to a second zone from the system airflow in response to a relative volume difference between the first zone and the second zone.

12. A method as recited in claim 11, wherein said step (1) further comprises the step of:
   determining the greater of a total cooling system airflow and a total heating system airflow.

13. A method as recited in claim 12, wherein said step (1) further comprises the step of:
utilizing the greater of the total cooling system airflow and the total heating system airflow as the system airflow.

14. A method as recited in claim 11, further comprising the step of:
(3) determining a first continuous zone airflow and a second continuous zone airflow by adjusting the first zone airflow for the first zone by a first proportionality constant and the second zone airflow for the second zone by a second proportionality constant.

15. A method as recited in claim 14, further comprising the step of:
(4) determining the first proportionality constant for the first zone and the second proportionality constant for the second zone in response to a first desired flow speed for the first zone and a second desired flow speed for the second zone.

16. A method as recited in claim 15, wherein said step (4) further comprises the step of:
positioning a first damper for the first zone to a first position in response to the first desired flow speed such that a greater amount of airflow is permitted to enter the first zone as the first desired flow speed is increased; and
positioning a second damper for the second zone to a second position in response to the second desired flow speed such that a greater amount of airflow is permitted to enter the second zone as the second desired flow speed is increased.

17. A method of supplying a continuous zone airflow to a multiple of zones comprising the steps of:
(1) determining a first zone airflow for a first zone and a second zone airflow for a second zone in response to a relative volume difference between a first volume of the first zone and a second volume of the second zone; and
(2) supplying a first continuous zone airflow for the first zone and a second continuous zone airflow for the second zone by adjusting the first zone airflow for the first zone by a first proportionality constant and the second zone airflow for the second zone by a second proportionality constant.

18. A method as recited in claim 17, wherein said step (1) further comprises the step of:
determining the relative size of the first zone by supplying the system airflow to the first zone with a first zone damper at full open position and a second zone damper at full closed position; and
determining the relative size of the second zone by communicating the system airflow to the second zone with the second zone damper at full open position and the first zone damper at full closed position.

19. A method as recited in claim 17, wherein said step (2) further comprises the step of:
determining the first proportionality constant for the first zone based upon a first desired flow speed and determining the second proportionality constant for the second zone based upon a second desired flow speed.

20. A method as recited in claim 17, wherein said step (2) further comprises the step of:
determining a first damper position in response to the first desired flow speed and a second damper position in response to the second desired flow speed such that a greater amount of airflow is permitted to enter the first zone and the second zone as the first desired flow speed and the second desired flow speed are increased.

21. A method as recited in claim 17, further comprising the step of:
(3) supplying a total system airflow in response to the first continuous zone airflow and the second continuous zone airflow such that a percentage of the total system airflow is continuously supplied to both the first zone and the second zone when the first desired flow speed and the second desired flow speed are selected.

22. A method as recited in claim 21, wherein said step (3) further comprises the step of:
supplying the percentage of the total system airflow to the first zone independently of the percentage of the total system airflow delivered to the second zone such that when a first desired flow speed for the first zone is changed the percentage of the total system airflow delivered to the first zone increases while the percentage of the total system airflow delivered to the second zone remains static.

23. A method of supplying a continuous zone airflow to a multiple of zones comprising the steps of:
(1) determining a nominal system airflow;
(2) determining a relative size of a first zone and a second zone;
(3) calculating a nominal zone airflow in response to the nominal system airflow and the relative zone size of the first zone and the second zone;
(4) delivering the continuous zone airflow of the first zone independently of the continuous zone airflow of the second zone in response to the nominal zone airflow and a user selected fan airflow level selected for each of the first zone and the second zone.

24. The method as recited in claim 23, wherein said step (1) comprises:
selecting the higher of a cooling airflow and a heating airflow.

25. The method as recited in claim 23, wherein said step (2) comprises:
determining the relative size of the first zone by supplying the nominal system airflow to the first zone with a first damper at full open position and a second damper at full closed position; and
determining the relative size of the second zone by communicating the nominal system airflow to the second zone wit the second damper at full open position and the first damper at full closed position.

26. The method as recited in claim 23, wherein said step (4) comprises:
assigning a first proportionality constant to the user selected fan airflow level selected for the first zone and assigning a second proportionality constant to the user selected fan airflow level selected for the second zone.

* * * * *